Jan. 11, 1949.   J. N. WOLFRAM   2,458,817
COUPLING FOR TUBES
Filed Dec. 2, 1944

Inventor
John N. Wolfram
By Mason, Porter & Diller
Attorneys

Patented Jan. 11, 1949

2,458,817

UNITED STATES PATENT OFFICE 2,458,817

COUPLING FOR TUBES

John N. Wolfram, Cleveland, Ohio, assignor to The Parker Appliance Company, Cleveland, Ohio, a corporation of Ohio Application December 2, 1944, Serial No. 566,316

1 Claim. (Cl. 285—120)

The invention relates to new and useful improvements in a coupling for tubes, and more particularly to a coupling where the tube is held by mechanical means and is also sealed by the aid of a sealing gasket.

An object of the invention is to provide a coupling for a tube having a preformed head providing a shoulder at the outer face of the tube engaged by one of the coupling members and a shoulder which cooperates with the body member of the coupling in the compressing of the sealing gasket, and which also limits the closing movement of the coupling.

A further object of the invention is to provide a coupling for a tube having the end portion thereof bent outwardly to provide a shoulder gripped by the coupling members and thence inwardly at right angles to the axis of the tube to provide an abutment shoulder for engagement with the sealing gasket and for limiting the closing movement of the coupling.

These and other objects will in part be obvious and will in part be hereinafter more fully disclosed.

Figure 1:
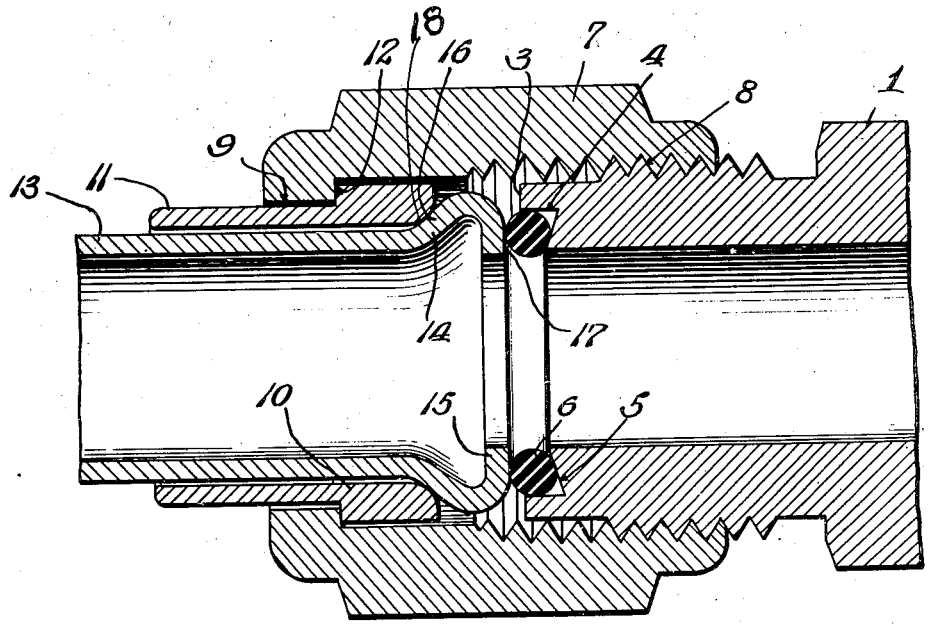
Figure 1 is a longitudinal sectional view through a coupling embodying the improvements with the nut turned onto the body member with finger tightness.

The improved coupling includes a body member 1 having a bore 2 therethrough of substantially the inner diameter of the tube which is to be secured to the coupling. The body member at its inner end terminates in an annular surface 3. The end portion of the body member is counterbored to provide a cylindrical surface 4 and a radial surface 5 which inclines to the right as viewed in Figure 1. These two surfaces 4 and 5 form a recess for a ring gasket indicated at 6. The ring gasket is so dimensioned that it is of slightly larger diameter than the inner diameter of the bore 4 so that when placed in the recess it will be retained therein by the expansion of the gasket against the wall of the bore 4. This gasket is so dimensioned that it projects beyond the end 3 of the body member.

Figure 2:
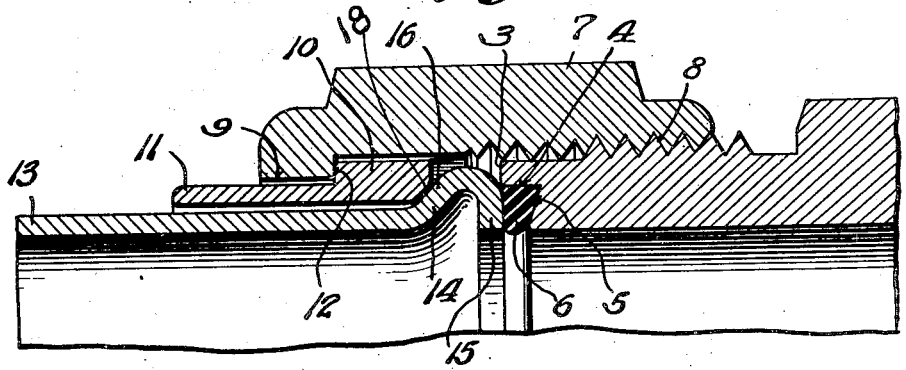
Figure 2 is a view similar to Figure 1 but showing the coupling completely closed.

Attached to the body member is a nut 7, said nut being connected to the body member by a thread 8 which as shown is on the external surface of the body member. This threaded connection may be otherwise formed. The nut is provided with an inwardly extending flange 9. Disposed within the nut is a sleeve 10 having an extension 11 which projects out through the nut and along the tube which is clamped to the couplings. This sleeve has a shoulder 12 which is adapted to engage the flange on the nut. The tube 13 as shown in Figures 1 and 2 is deformed outwardly to form a bell-shaped portion 14 and then it is turned inwardly as indicated at 15.

The inner end of the inturned portion is substantially in alignment with the inner surface of the tube. This provides a tapered surface 16 at the outer side of the outwardly preformed portion of the tube and this tapered surface is adapted to be engaged by the inner end of the sleeve 10 which is preferably of cylindrical contour as indicated at 18. The inturned portion 15 of the tube has a shoulder or abutment face 17 which lies in a plane at right angles to the longitudinal axis of the coupling. The deformable ring gasket 6 is first contacted with by this abutment face 17 of the tube end when the nut is threaded onto the body member. As shown in Figure 2, the nut has been turned all the way onto the body member. This deforms the ring gasket 6 so that it substantially fills the recess between the inner end of the body member and the radial surface 5 thereof. The end of the tube will contact with the body member and limit further closing of the coupling. This will prevent the extrusion of the gasket into the passage through the body member and through the tube.

It will be noted that the tube end is held to the coupling by mechanical features in the coupling members, that is, the flange 9 of the nut presses against the shoulder 12 of the sleeve and forces the portion 18 of the sleeve into engagement with the tapered shoulder 16 on the tube end and this clamps the end of the tube against the end of the body member. At the same time the tube is forced by the nut toward the body member and the gasket will be deformed in its recess which will completely fill the recess and form a liquid-tight joint between the tube and the body member. Any pressure on the line will tend to press the deformable gasket further into the recess and inasmuch as the tube is clamped against the end of the body member, the recess is closed so that there is no chance for the gasket being forced out of its recess.

It will be noted that there is no deforming of the tube during the clamping of the same to the coupling members. The tube is merely moved forward toward the body member as the nut is turned onto the body member until it is brought into contact with the gasket and then it will deform the gasket which requires only a comparatively light turning torque applied to the nut and finally the tube end will contact with the body member and limit all further closing of the coupling.

It is obvious that minor changes in the details of construction may be made without departing from the spirit of the invention as set forth in the appended claim.

I claim:

A coupling for tubes having the end thereof bent outwardly to provide a shoulder and thence inwardly into a flat abutment face at right angles to the axis of the tube, comprising a body member, a nut having a thread engagement therewith, a sleeve associated with said nut and adapted at its inner end to engage the preformed shoulder on the tube for clamping the abutment face of the tube against the outer end of the body member, said body member having at its outer end and the inner side thereof a recess, a ring gasket located in said recess and dimensioned so as to protrude beyond the end of the body member when initially seated in the recess, said gasket being engaged by the flat end portion of the tube when the coupling is closed so that the gasket will be deformed and caused to fill the recess solely by the pressure of the tube end thereagainst, thus providing a liquid-tight joint between the tube and the body member.

JOHN N. WOLFRAM.

REFERENCES CITED

The following references are of record in the file of this patent:

UNITED STATES PATENTS

| Number | Name | Date |
| --- | --- | --- |
| 1,580,462 | Woodruff | Apr. 13, 1926 |
| 1,604,868 | Woodruff | Oct. 26, 1926 |